United States Patent [19]

Takaada et al.

[11] Patent Number: 5,799,739
[45] Date of Patent: Sep. 1, 1998

[54] BATTERY-DRIVEN TOOL HAVING GAS DISCHARGING FUNCTION

[75] Inventors: Kenichi Takaada, Hitachi; Hideki Kurosawa, Hitachinaka; Yoshiaki Adachi, Hitachinaka; Hideki Watanabe, Hitachinaka, all of Japan

[73] Assignee: Hitachi Koki Co., Ltd., Japan

[21] Appl. No.: 740,218

[22] Filed: Oct. 25, 1996

[30] Foreign Application Priority Data

Nov. 2, 1995 [JP] Japan .................................. 7-285655

[51] Int. Cl.⁶ .................................................. B25F 5/00
[52] U.S. Cl. .................................................. 173/217
[58] Field of Search ........................... 173/217, 171; 227/129, 131, 156; 410/47, 50

[56] References Cited

U.S. PATENT DOCUMENTS

| 4,081,704 | 3/1978 | Vassos et al. | 173/217 |
| 4,493,223 | 1/1985 | Kishi et al. | 173/217 |
| 4,930,583 | 6/1990 | Fushiya et al. | 173/217 |
| 5,054,563 | 10/1991 | Zapf | 173/217 |
| 5,360,073 | 11/1994 | Akazawa | 173/217 |
| 5,553,675 | 9/1996 | Pitzen et al. | 173/217 |

FOREIGN PATENT DOCUMENTS

| 6-3577 | 1/1994 | Japan . |
| 6-46877 | 6/1994 | Japan . |

*Primary Examiner*—Scott A. Smith
*Attorney, Agent, or Firm*—Parkhurst & Wendel

[57] ABSTRACT

In a battery-driven tool, comprising a motor equipped with a fan and air windows arranged on the casing where the motor is positioned and for sending cooling air generated by rotation of the fan to outside, the object of the present invention is to send hydrogen gas generated by overdischarge to outside so that hydrogen gas is not accumulated in the battery chamber, and to exclude undesirable effect on the designing of the battery-driven tool. To attain the object, the motor chamber to accommodate the motor equipped with the fan is communicated with the battery chamber where the battery is accommodated.

3 Claims, 3 Drawing Sheets

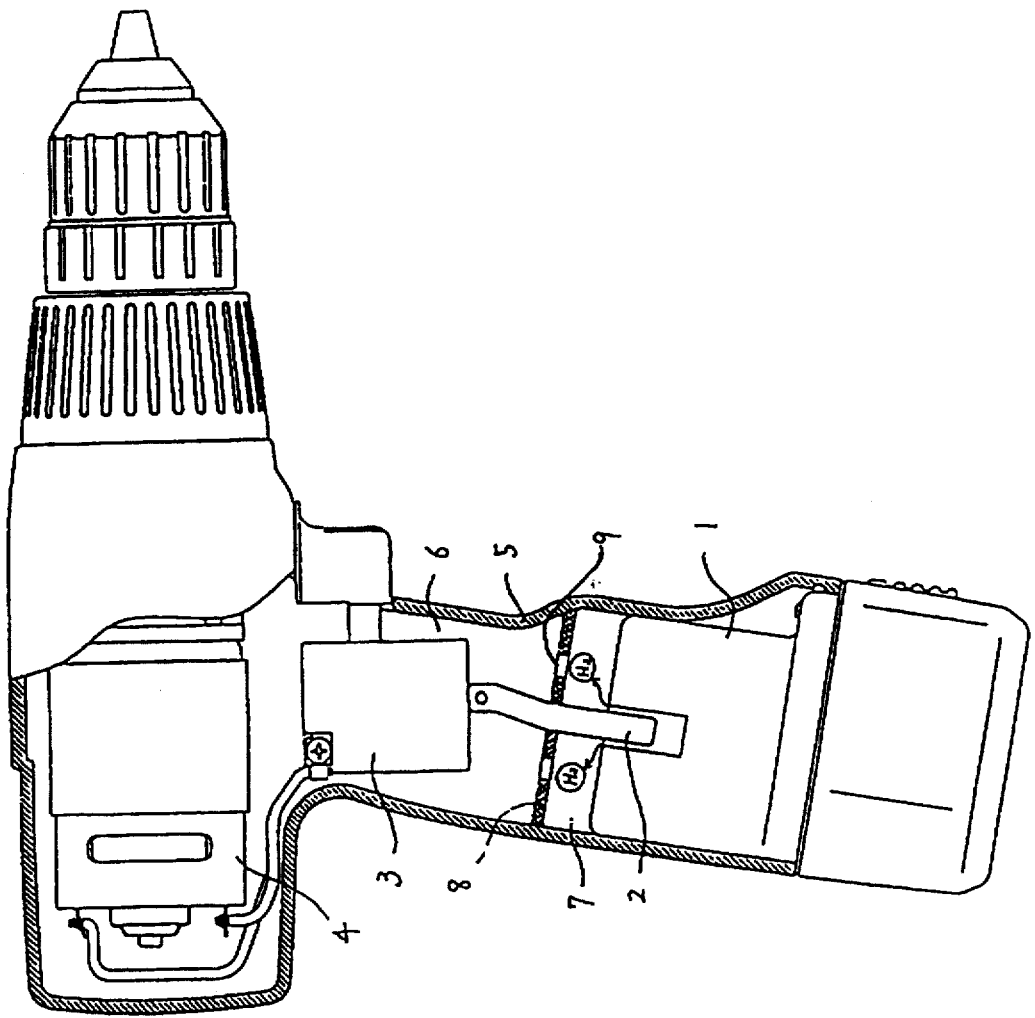

BATTERY-DRIVEN TOOL HAVING GAS DISCHARGING FUNCTION

BACKGROUND OF THE INVENTION

1. Field of the Invention

The present invention relates to a battery-driven tool, and in particular to a battery-driven tool designed to discharge hydrogen gas generated by overdischarge of the battery to the outside thereby preventing accumulation thereof in a battery chamber where the battery is accommodated.

2. Description of the Related Art

Among various types of batteries, nickel-cadmium batteries are now widely used as a secondary battery. In particular, it is used as battery capable of supplying high-rate current such as a battery for battery-driven tools. As active materials, the anode of a nickel-cadmium battery comprises nickel oxide and the cathode comprises a cadmium compound, while sodium hydroxide is used as the major electrolyte. With these materials, a single cell can provide electromotive force of 1.2 V. Usually, a plurality of cells are connected in series in a battery-driven tool. For example, when 8 cells are used, the battery can provide electromotive force of: $8 \times 1.2 = 9.6$ V. These cells have a certain capacity determined by performance characteristics of the active materials. If examined in detail, however, there are variations in capacity of the cells. When a battery-driven tool is used, the following reaction occurs at the anode during discharge:

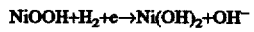

and the following reaction develops at the cathode:

a whole, the following reaction occurs:

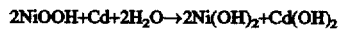

Because the battery-driven tools are used with high-rate current, the batteries are often in the state of overdischarge. When there are variations in the capacity of the cells, some of the cells have active materials at the anode, all of them in discharged state, while other cells still maintain discharging capacity. As a result, the cells maintaining discharging capacity reversely charge the cells which are in a totally discharged state. This phenomenon is called polarity reversal, and 2OH⁻ ions generated at the anode are electrolyzed and hydrogen is generated. The generated hydrogen gas stagnates inside casing near the battery inserted portion. Due to vibration of the battery-driven tool, chattering occurs at contact portions of power terminals. Sparks scatter and may act as an ignition source, and hydrogen gas may cause explosion.

To overcome this problem, it has been practiced in the past as follows. As shown in FIG. 3, a casing 5 is provided with a vent hole 15 to communicate a battery chamber 7 with the atmospheric air so that the generated hydrogen gas flows outside.

The conventional type battery-driven tool as described above is designed in such manner that hydrogen gas generated in the battery chamber 7 by overdischarge is spontaneously sent out through the vent hole 15. As a result, hydrogen gas is often accumulated in the battery chamber 7. Also, there are some restrictions on design of the battery-driven tool because the vent hole 15 is provided on a handle of the casing 5.

SUMMARY OF THE INVENTION

To eliminate the disadvantages of the conventional type battery-driven tool as described above, it is an object of the present invention to provide a battery-driven tool, which is designed in such manner that hydrogen gas generated by overdischarge is forcibly sent outside to prevent stagnation of hydrogen gas in the battery chamber and to avoid explosion, and which has no undesirable factor to adversely affect the designing of the battery-driven tool.

The above object can be attained by designing the battery-driven tool as follows: A motor chamber accommodating a motor equipped with a fan is communicated with a battery chamber where a battery is accommodated.

BRIEF DESCRIPTION OF THE DRAWINGS

These objects and features of the present invention will become more readily apparent from the following detailed description of the preferred embodiments taken in conjunction with the accompanying drawings in which:

FIG. 3 is a partially cutaway front view of an example of a conventional type battery-driven tool.

DETAILED DESCRIPTION OF THE INVENTION

Figure 1:
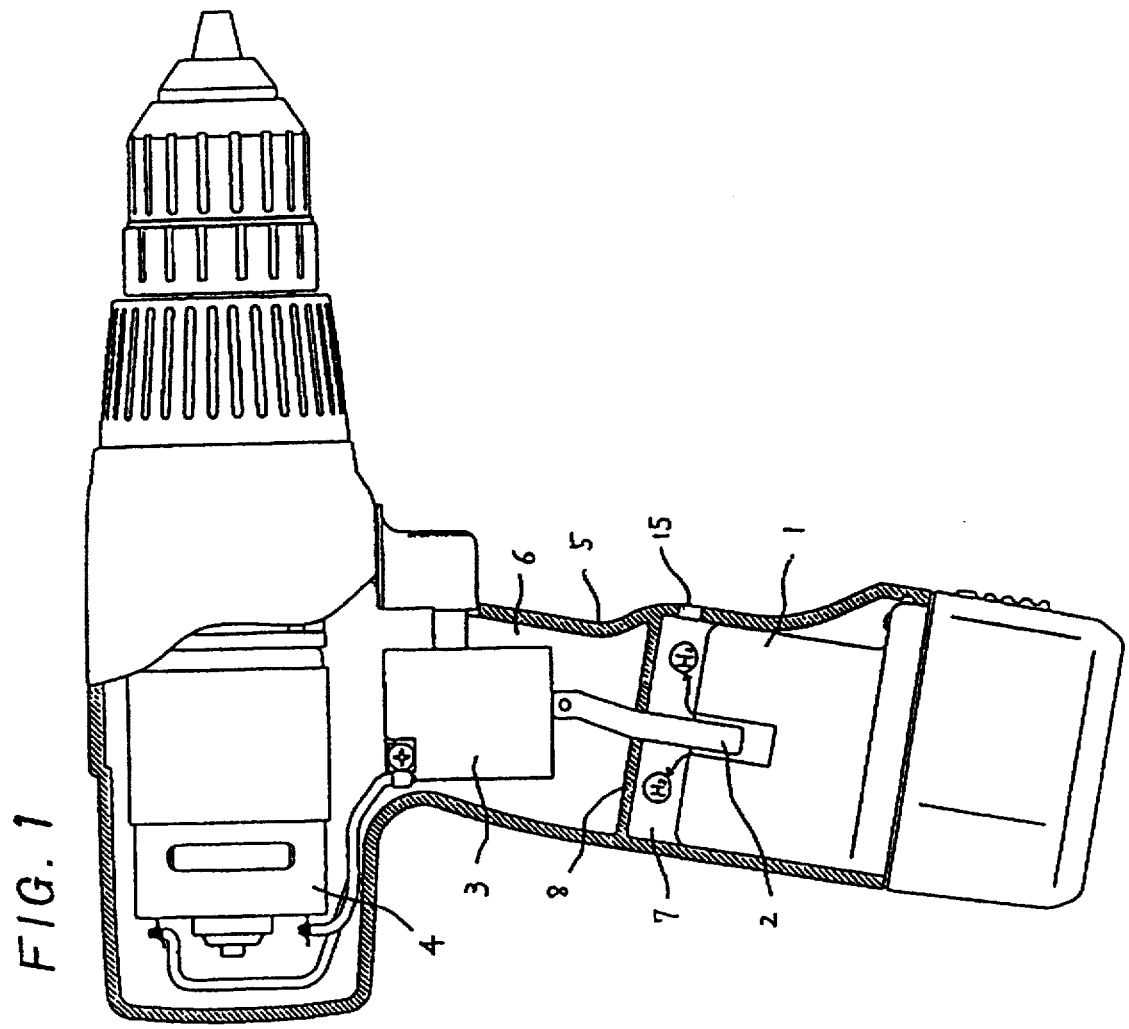
FIG. 1 is a partially cutaway front view of an embodiment of a battery-driven tool according to the present invention.

In the following, description will be given on a preferred embodiment of the present invention referring to the drawings. FIG. 1 is a partially cutaway front view of a portable electric drill, representing a preferred embodiment of the present invention, and FIG. 2 is a cross-sectional side view of the portable electric drill.

Figure 2:
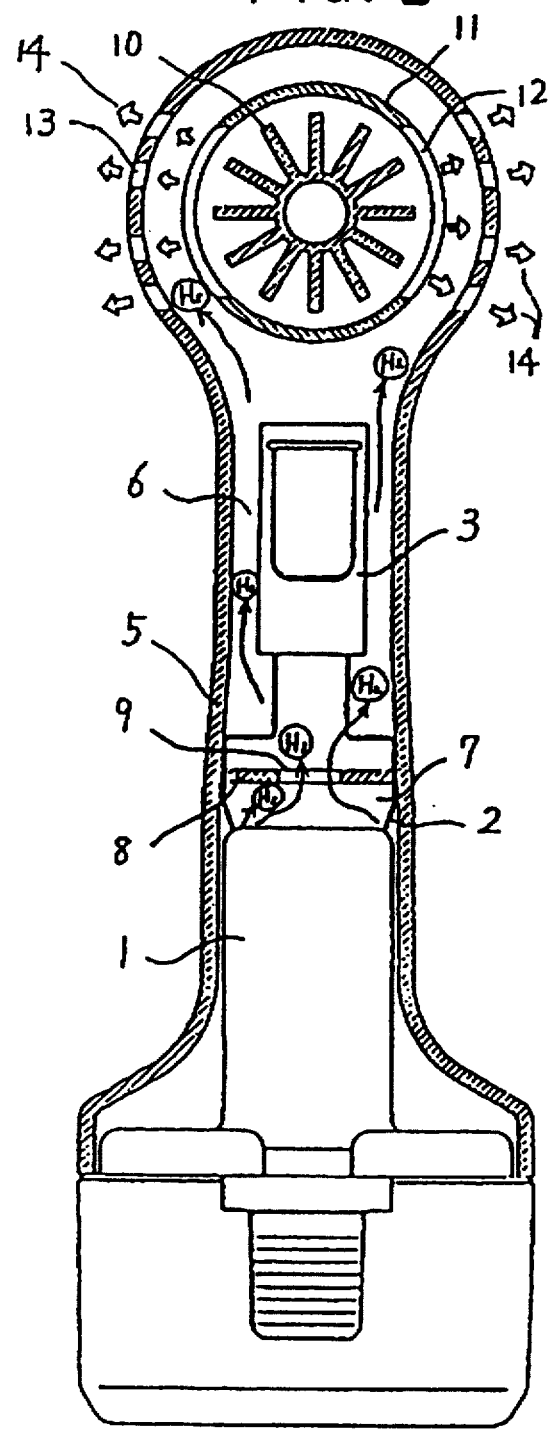
FIG. 2 is a cross-sectional side view of an embodiment of a battery-driven tool of the present invention.
Figure 1:
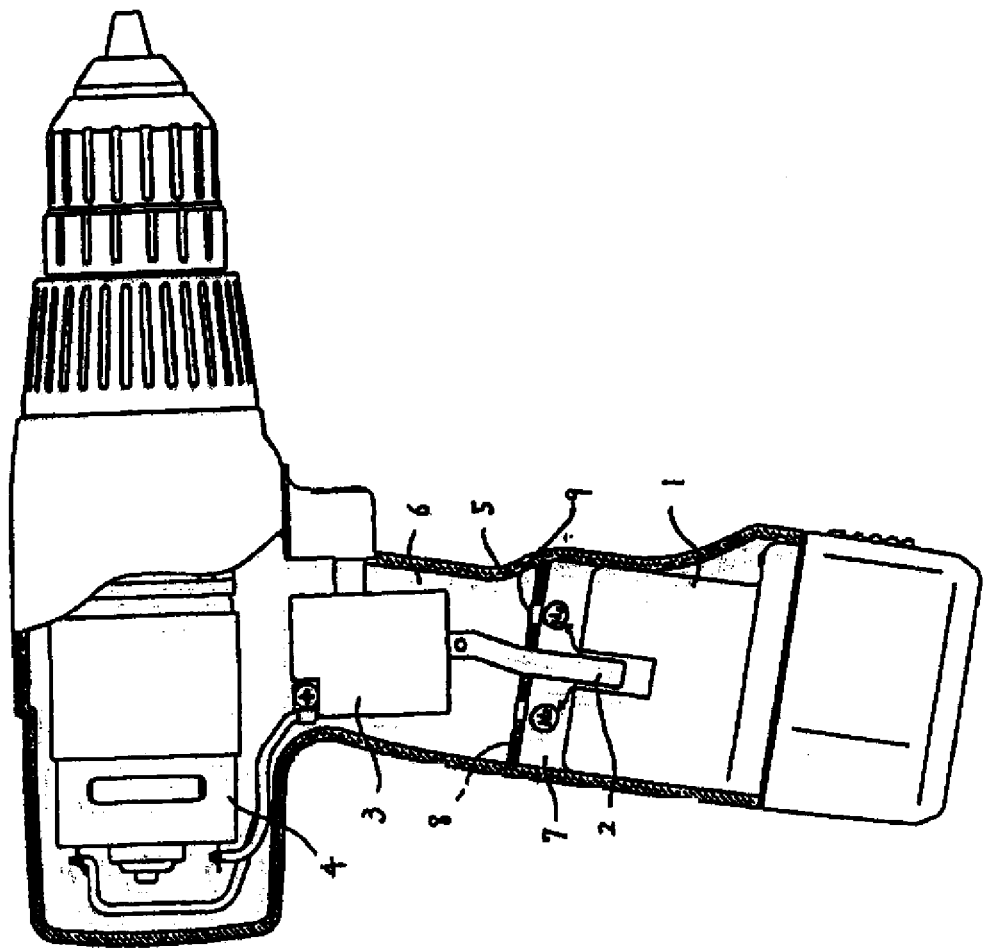

As shown in FIG. 1 and FIG. 2, a battery 1 is removably mounted in a casing 5 and supplies voltage to a motor 4 via a terminal 2, which is directly connected to a switch 3. In order to keep contact pressure to the battery 1 at a constant level, the terminal 2 is squeezed by a partition 8, which is arranged between a battery chamber 7 and a motor chamber 6, and current receiving portions are maintained at constant distance. Also, as shown in FIG. 1 and FIG. 2, the switch 3 is maintained from side wall of the casing 5 with a gap between them.

The motor 4 is equipped with a fan 10, which is integrally rotated with a motor shaft, and air windows 12 are provided on a motor casing 11 where the fan 10 is positioned, and air windows 13 are provided on the casing 5 where the air windows 12 are positioned. According to the above described structure, cooling air 14 generated by rotation of the motor 4 is sent outside via the air windows 12 and 13. On the other hand, ventilation holes 9 are provided on the partition 8 to provide communication between the motor chamber 6 and the battery chamber 7.

When the battery-driven tool designed as above is operated, the fan 10 is integrally rotated with the rotation of the motor 4, and the cooling air 14 is continuously sent outside as shown in FIG. 2. Further, when capacity of the battery 1 decreases as the operation is continued, hydrogen gas is generated in the battery chamber 7 by the polarity reversal as explained above. However, when the battery-driven tool is operated, pressure in the motor chamber 6 is reduced due to the rotation of the fan 10. Because the motor chamber 6 is communicated with the battery chamber 7 via the ventilation holes 9, hydrogen gas generated in the battery chamber 7 is forcibly sent outside through the ventilation holes 9, the motor chamber 6 and the air windows 13. In this way, even when hydrogen gas is generated due to polarity reversal, hydrogen gas is not accumulated in the battery chamber 7. Thus, even when sparks are generated at contact portions of the terminal 2, no explosion of hydrogen gas occurs.

In the above embodiment, ventilation holes 9 are provided between the motor chamber 6 and the battery chamber 7 to communicate the motor chamber 6 with the battery chamber 7. However, the same effect can be obtained when the motor chamber 6 is communicated with the battery chamber 7 by modifying the shape of the partition 8 or by modifying the method to retain the terminal 2.

It is possible according to the present invention to reduce pressure in the battery chamber by rotation of the fan incorporated in the motor because the motor chamber is communicated with the battery chamber, and even when hydrogen gas is generated in the battery chamber, it is forcibly sent outside. Because hydrogen gas is not accumulated in the battery chamber, explosion can be avoided in a reliable manner. Outlets to send the hydrogen gas outside are air windows, through which cooling air is discharged, and this does not adversely affect the designing of the battery-driven tool.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

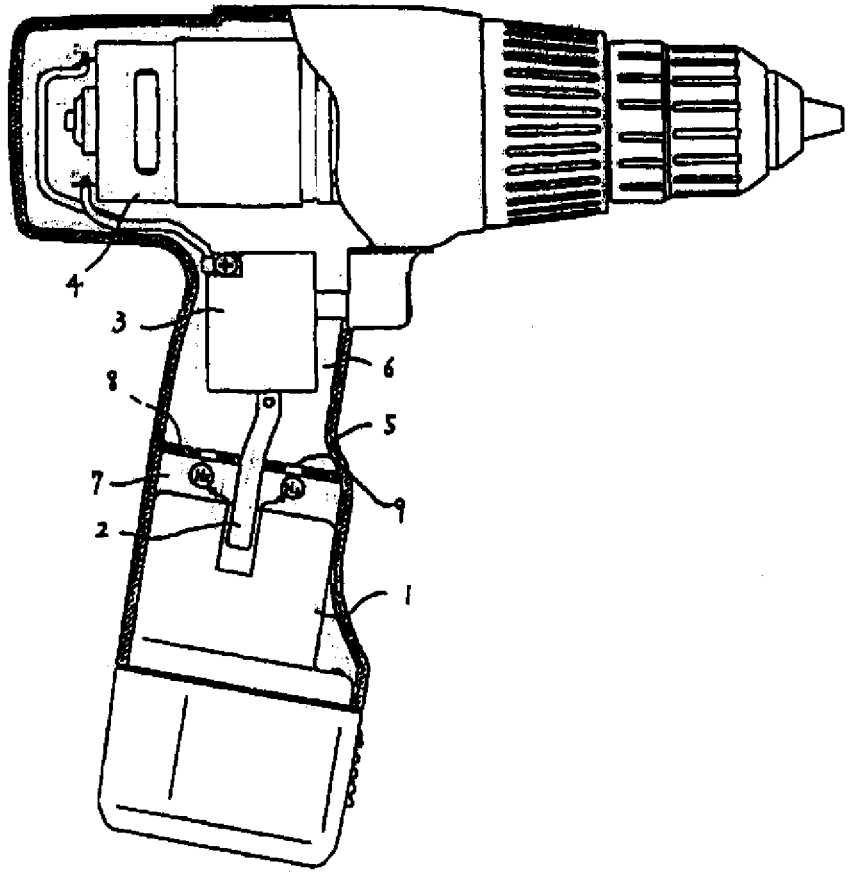

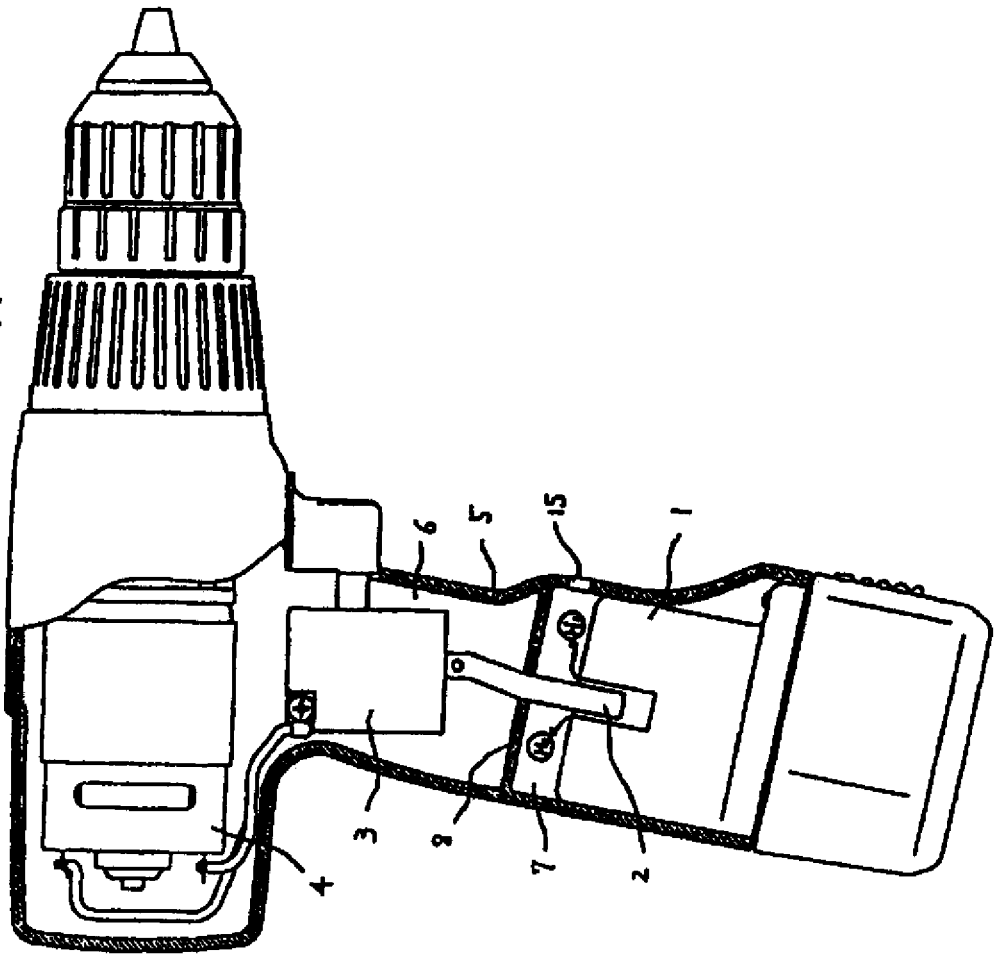

What is claimed is:

1. A battery-driven tool, comprising:
   a casing having a handle portion;
   a motor chamber arranged in said casing;
   a motor accommodated in said motor chamber and equipped with a fan;
   air windows provided in said casing adjacent said motor chamber for passing therethrough cooling air generated by rotation of said fan;
   a battery chamber for removably accommodating a battery, said battery chamber comprising a portion of said handle portion;
   means for supplying electric power from said battery to said motor, said battery chamber and said motor chamber being separated from each other by a partition; and
   means for providing communication between a space in said battery chamber and a space in said motor chamber, said means for providing communication comprising in said partition a through hole for receiving a part of said means for supplying electric power and a plurality of vent holes so that a gas in said battery chamber can flow into said motor chamber.

2. A battery-driven tool according to claim 1, wherein said means for supplying electric power from said battery to said motor comprises a switch mounted in said motor chamber, and a terminal member, connected to said switch, penetrating said partition and contacting a terminal of said battery in said battery chamber.

3. A battery-driven tool according to claim 1, wherein a rotatable shaft of the tool is coaxial with an axis of said motor in said motor chamber.

* * * * *

UNITED STATES PATENT AND TRADEMARK OFFICE
CERTIFICATE OF CORRECTION

PATENT NO. : 5,799,739
APPLICATION NO. : 08/740218
DATED : September 1, 1998
INVENTOR(S) : Kenichi Takaada et al.

It is certified that error appears in the above-identified patent and that said Letters Patent is hereby corrected as shown below:

In the Drawings

Title page, illustrative fig. 1 should be deleted and substitute therefore the attached title page consisting of illustrative fig. 1.

The drawing sheets 1 and 3 of 3 consisting of Fig(s) 1 and 3 should be deleted and substitute therefore the attached drawing sheets 1 and 3 of 3 consisting of Fig(s) 1 and 3.

Signed and Sealed this

Second Day of June, 2009

JOHN DOLL
*Acting Director of the United States Patent and Trademark Office*

United States Patent [19]

Takaada et al.

[11] Patent Number: 5,799,739
[45] Date of Patent: Sep. 1, 1998

[54] BATTERY-DRIVEN TOOL HAVING GAS DISCHARGING FUNCTION

[75] Inventors: Kenichi Takaada, Hitachi; Hideki Kurosawa, Hitachinaka; Yoshiaki Adachi, Hitachinaka; Hideki Watanabe, Hitachinaka, all of Japan

[73] Assignee: Hitachi Koki Co., Ltd., Japan

[21] Appl. No.: 740,218

[22] Filed: Oct. 25, 1996

[30] Foreign Application Priority Data

Nov. 2, 1995 [JP] Japan ............................ 7-285655

[51] Int. Cl.⁶ ........................................ B25F 5/00
[52] U.S. Cl. ........................................ 173/217
[58] Field of Search .................... 173/217, 171;
227/129, 131, 156; 410/47, 50

[56] References Cited

U.S. PATENT DOCUMENTS

| | | | |
|---|---|---|---|
| 4,081,704 | 3/1978 | Vassos et al. | 173/217 |
| 4,493,223 | 1/1985 | Kishi et al. | 173/217 |
| 4,930,583 | 6/1990 | Fushiya et al. | 173/217 |
| 5,054,563 | 10/1991 | Zapf | 173/217 |
| 5,360,073 | 11/1994 | Akazawa | 173/217 |
| 5,553,675 | 9/1996 | Pitzen et al. | 173/217 |

FOREIGN PATENT DOCUMENTS

| | | |
|---|---|---|
| 6-3577 | 1/1994 | Japan. |
| 6-46877 | 6/1994 | Japan. |

*Primary Examiner*—Scott A. Smith
*Attorney, Agent, or Firm*—Parkhurst & Wendel

[57] ABSTRACT

In a battery-driven tool, comprising a motor equipped with a fan and air windows arranged on the casing where the motor is positioned and for sending cooling air generated by rotation of the fan to outside, the object of the present invention is to send hydrogen gas generated by overdischarge to outside so that hydrogen gas is not accumulated in the battery chamber, and to exclude undesirable effect on the designing of the battery-driven tool. To attain the object, the motor chamber to accommodate the motor equipped with the fan is communicated with the battery chamber where the battery is accommodated.

3 Claims, 3 Drawing Sheets